Sept. 30, 1947. F. CREEDY 2,428,203
MACHINE FOR CHANGING THE FREQUENCY OF ALTERNATING CURRENTS
Filed Sept. 20, 1945 3 Sheets-Sheet 1
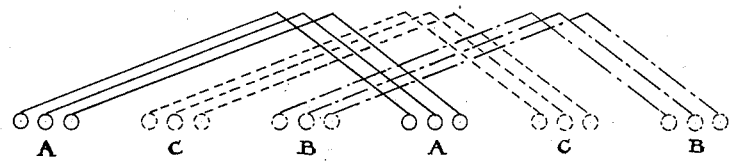
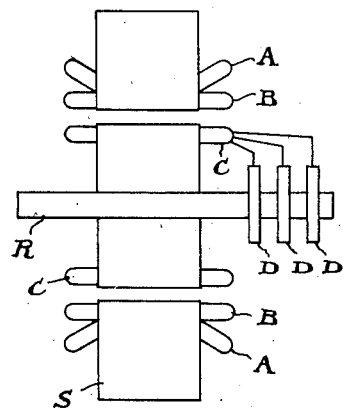
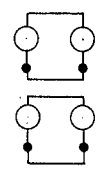
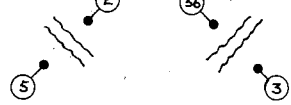
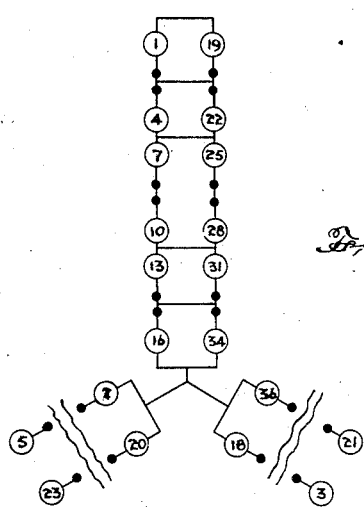
Inventor
Frederick Creedy Sept. 30, 1947.    F. CREEDY    2,428,203
MACHINE FOR CHANGING THE FREQUENCY OF ALTERNATING CURRENTS
Filed Sept. 20, 1945    3 Sheets-Sheet 2

Inventor
Frederick Creedy
By
Attys.

Inventor
Frederick Creedy

Patented Sept. 30, 1947

2,428,203

UNITED STATES PATENT OFFICE 2,428,203

MACHINE FOR CHANGING THE FREQUENCY OF ALTERNATING CURRENTS

Frederick Creedy, Toronto, Ontario, Canada, assignor to Sangamo Electric Company, Springfield, Ill., a corporation of Illinois Application September 20, 1945, Serial No. 617,628
In Canada May 24, 1945

14 Claims. (Cl. 172—281)

This invention relates to machines for changing the frequency of alternating currents and the principal objects of this invention are to devise a machine which may be manufactured at much less cost than the ordinary coupled motor generator set and which will occupy much less space than such motor generator set and will also effect material economy in operation.

The principal feature of the present invention consists in constructing the frequency changer in a single unit with windings producing multipolar magnetic fields having one number and windings producing multipolar magnetic fields of another number differing by four or more in the same magnetic circuit and a common winding on one member carrying both motor and generator currents.

In the accompanying diagrammatic drawings:

Figure 1 illustrates a typical construction of rotor and stator arrangement to include the present invention;

Figure 2 is an illustration of the symbol used to designate sections of stator and rotor windings;

Figure 3 is a diagrammatic illustration of the windings designated by the symbol illustrated in Figure 2;

Figure 3a is a small diagram showing individual pairs of winding sections connected in parallel and otherwise isolated;

Figure 4 is an illustration of a 2 pole stator winding;

Figure 5 is an illustration of a 12 pole stator winding;

Figure 8 is an illustration of the rotor winding arrangement;

Figures 6, 7:
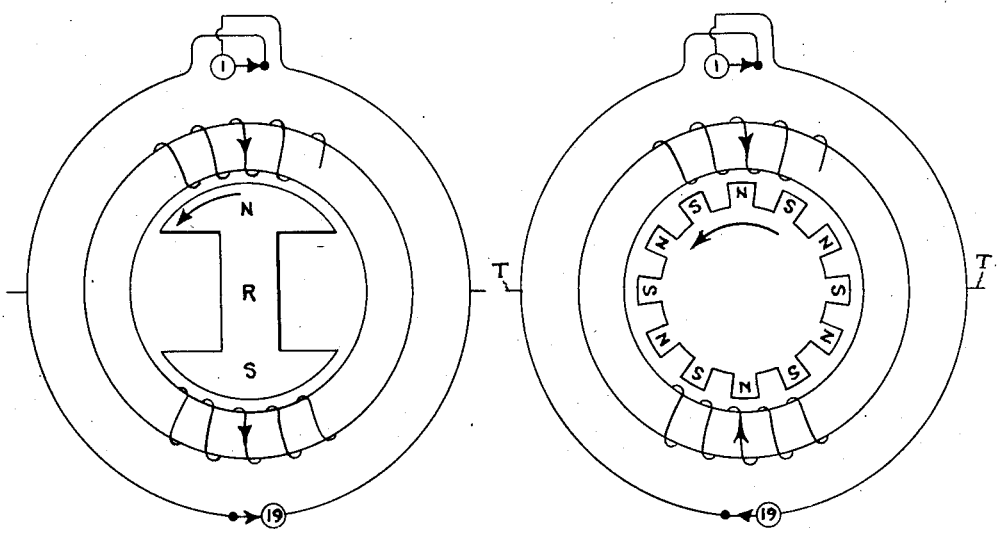
Figure 6 is an illustration of an arrangement of 2 pole field windings.
Figure 7 is an illustration similar to Figure 6 showing a 12 pole field winding arrangement.

In the typical rotor stator construction illustrated in Figure 1 the stator S is provided with 2 pole field windings A and 12 pole field windings B, and the rotor R is provided with windings C.

The stator windings A will be connected with the incoming current circuit, which for the purpose of illustration may be 25 cycle which it may be desired to transform to say 175 cycles. The 25 cycle circuit may, in co-operation with certain circuits of the rotor windings C, be adapted for an odd number of pairs of magnetic poles in one field, for the purpose of illustration, say 2 pole operation, and will operate as a motor and rotate the rotor. This pole number may be called the motor pole number.

The stator field winding B, which is also connected with the incoming circuit, may be adapted for an even number of pairs of magnetic poles in another field, say for 12 poles, and such windings C will act as a generator and the produced current flows to slip rings D. D. D. at 175 cycles. This pole number may be called the generator pole number.

It is known that a single magnetic circuit may carry fluxes of two distinct pole numbers produced by two distinct windings, provided the numbers of poles of these windings differ by four or more, thereby ensuring both mechanical and magnetic balance.

In the diagram Figure 2, a symbol is shown comprising a circle 1 joined to a dot 2 by a straight line 3 which represents a group or section of coils connected in series and the windings dealt with herein will be presumed to be drum type windings made up of a number of such sections of coils and these windings will differ by the number of turns per coil and pitch of the windings, which may be determined in a manner well known in the art and by the inter-connection of the coils which is as herein described. Windings of other known types electro-magnetically equivalent to these may be used if desired.

Windings on rotary electric machines are wound in slots equally spaced around the circumference and they are divided into sections as illustrated in Figure 3 (where the circumference is developed into a straight line), by the letters AA, CC, BB. The symbol shown in Figure 2 represents one of the said sections, say AA. When two such sections are referred to as being diametrically opposite, it is meant that corresponding parts, for instance the first conductor of each, are diametrically opposite. The circle may be regarded as the beginning of the section and the dot as the end.

Figures 4, 5 and 8 illustrate the inter-connection of windings such as are shown in Figure 1.

In Figure 4 the winding illustrated is a normal 2 pole type consisting of 6 sections joined as a 3-phase winding. The numerals in the diagrams illustrate the order of arrangement of the sections of the windings around the circumference.

The 12 pole stator winding, which is illustrated in Figure 5, may also be a normal 3-phase winding or it may if desired be a D. C. winding.

It will be clear to those skilled in the art that the same change in frequency would be produced by windings giving any integral multiple of these pole-numbers and it will be understood that such windings may be employed if desired.

The rotor winding carries currents corresponding to both the stator windings, the one producing an odd number of pairs of magnetic poles and the other an even number of pairs of magnetic poles with the numbers of poles differing by four or more.

If 2 sections are diametrically opposite on the circumference, in 2 pole winding, these sections will be in fields of opposite polarity and will therefore have opposite voltages induced in them.

In the diagram Figure 6, two sections numbered 1 and 19 are shown diametrically opposite and joined in parallel. The voltage induced in section 1 by the north pole of the rotor is in the same direction around the circuit formed by the windings 1 and 19 connected as shown to that induced by the south pole in section 19 so that heavy local currents will result and if pairs of sections so connected are placed on the secondary member of an induction machine they will tend to cause rotation.

In the diagram Figure 7, the voltage induced by the two north poles of the 12 pole rotor in sections 1 and 19 are in opposite directions and they therefore cancel and produce no local currents through the path formed by the local circuit but a voltage is produced from the terminals T.

If two diametrically opposite sections joined in parallel as shown in Figure 8 are submitted to a 2 pole field, the voltage of the two sections will be additive around the short circuited circuit, that is, the two sections will form a short circuit in the 2 pole field, notwithstanding that they are in parallel in the 12 pole field, hence, such a winding as shown in Figure 8, while it is a 12 pole 3-phase winding connected in two parallels and will respond to a 12 pole field by generating E. M. F. across the slip ring D, is short circuited in a two pole field and will act as a squirrel cage rotor in respect to it. Thus with a single winding on the rotor both functions are performed.

It has been explained that two diametrically opposed sections can act as a short circuit on one pole number while being in parallel on another pole number. It will therefore be clear that in order to act in this manner they merely require to be connected in the manner shown, no other connection being essential.

In the application of the principles described two types of machines may with slight variations be constructed.

If the winding B is of the 3-phase type and is supplied with 25 cycle 3-phase current rotating in the opposite direction to that of the rotation of the rotor the machine will generate 175 cycles, or if rotating in the same direction will generate 125 cycles.

If however, winding B is a D. C. winding the machine will generate, on a ratio of 2 to 12, from 25 cycles, a current of 150 cycles.

It must be understood that the explanation given, of the operation of the rotor winding, will apply in any case where one number of pairs of poles is even and the other is odd so that the invention is not limited to the particular pole combination described.

Figure 10:
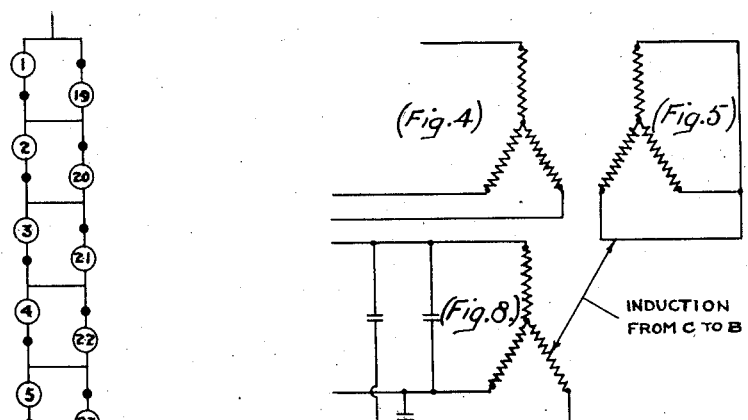
Figure 10 is a diagrammatic view showing the arrangement of condensers in parallel with high frequency windings.

The frequency generated by the rotor will, in many cases, be high and considerable improvements in characteristics may be obtained by connecting condensers in series or parallel with the high frequency winding as illustrated in Figure 10, which represents the assembly of Figures 4, 5 and 8 in more diagrammatic form.

It is well known that an induction generator will be self-exciting if sufficient condensance is connected across its terminals to supply the whole of the magnetizing volt amperes which it needs.

This is particularly easy at high frequencies under consideration and by so doing it becomes possible merely to short circuit the winding B, not supplying it from any external circuit.

The winding C then becomes the primary and load winding of a self-exciting induction generator, of which the winding B is the secondary, the frequency being slightly less than the frequency of rotation. In the instance described this frequency would be about 150 cycles.

A winding such as shown in Figure 3a in which individual pairs of sections, as indicated by the symbols, connected as shown but otherwise isolated, will act quite well as a secondary. It will thus be understood that such pairs of sections can be connected in any desired manner to obtain further circuits of any character required, for instance as shown in Figure 9 the winding is composed of 36 sections which is sufficient for a 12 pole 3-phase winding but nevertheless is joined up as a 2 pole winding.

Since a 2 pole winding only requires 6 sections while we have 36 available, the first 6 are joined in series, the others belonging to the same phase to the first six, Nos. 19-24 being connected in parallel and in opposition to the first set. It will be seen that these sections are in proper relation to form one phase of a 2 pole winding, the other phases being similar.

Figure 9:
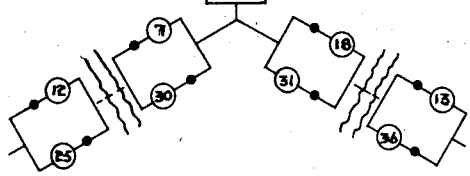
Figure 9 is a diagrammatic illustration of a winding of 36 sections joined up as a 2 pole winding.

A machine carrying a winding such as shown in Figure 9 on its stator and a winding such as shown in Figure 4 on its rotor, and having adequate condensance in parallel with such rotor winding to enable it to self-excite as an induction generator will transform from 25 cycles to 150 cycles in one machine with one winding on each member, thereby producing an enormous saving over the ordinary motor-generator machine.

It is known that certain windings exist, commonly known as internal cascade secondary windings or star-mesh windings, and described for instance in applicant's treatise "Theory and Design of Electric Machines," chapters XV and XVI, which produce a distribution of ampere conductors around the circumference corresponding to two polyphase distributions of different pole-numbers revolving in opposite directions.

Such windings are adapted for different pole-combinations by constructing them for different numbers of phases. The number of phases required to give any desired pole-combination is found by adding the number of pole pairs in the two fields. To produce 2 pole and 10 pole for instance, a winding of this type would have to be adapted for 1+5=6 phases.

Figure 11:
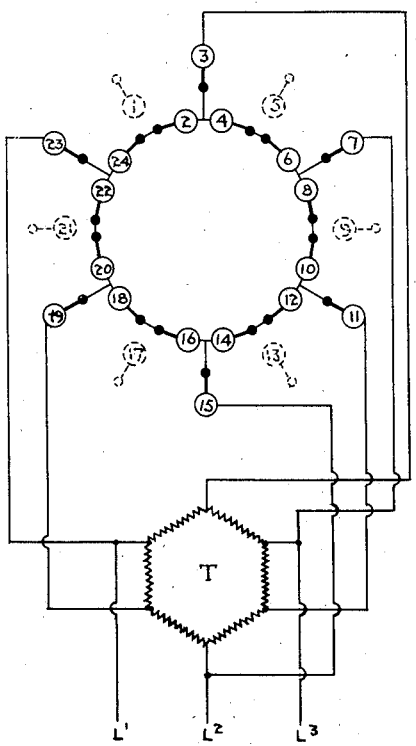
Figure 11 is a star mesh winding of a known type employed to generate simultaneously fields of two different pole members, together with the necessary exciting means and illustrating the application of the present invention thereto.

Using the symbolism described herein such a winding is shown in Figure 11. It takes the place of both windings A and B Figure 1. If it is to be fed from a 3-phase supply it must be used in conjunction with a phase transformer "T" of which many types are known, changing from 3 to 6 phases.

The sections are spaced as if they were 24 in number, sections 1, 5, 9, 13, 17, 21 shown dotted being omitted. All this is explained in the above-mentioned treatise.

Figure 12:
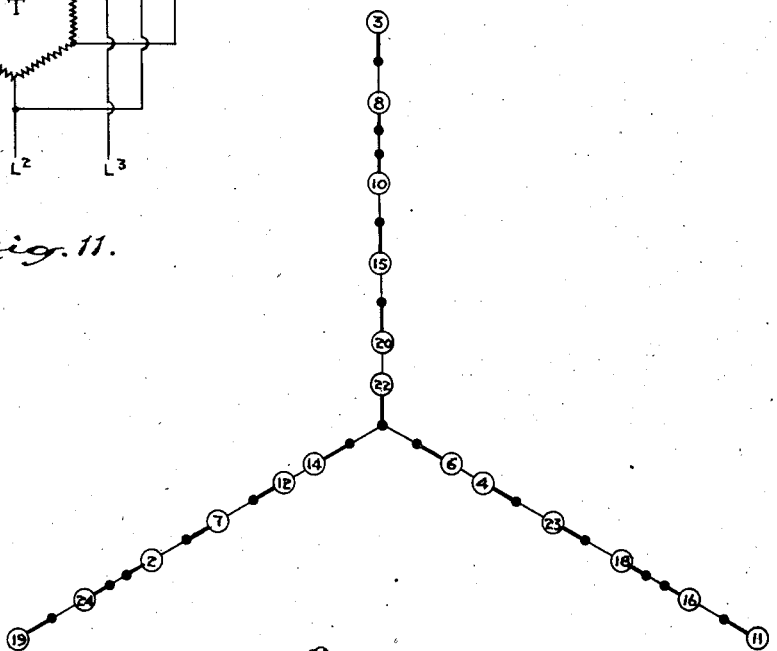
Figure 12 illustrates how in a particular case of a 2 and 10 pole operation a winding such as described in Figure 11 might be reconnected, so that it may be excited directly from a 3 phase circuit.

Since in a 6-phase or hexagonal star-mesh combination the star currents are equal to the mesh current, a further simplification of this winding is possible by connecting all windings of the same or opposite phase in series as shown in Figure 12. This eliminates a phase converter.

The two pole and 10 pole combination does not conform to the rule that one pole-number shall be even and the other odd, but this does not render it impossible to design a winding which shall act as a secondary on one pole-number and generate a voltage on the other.

Figure 13:
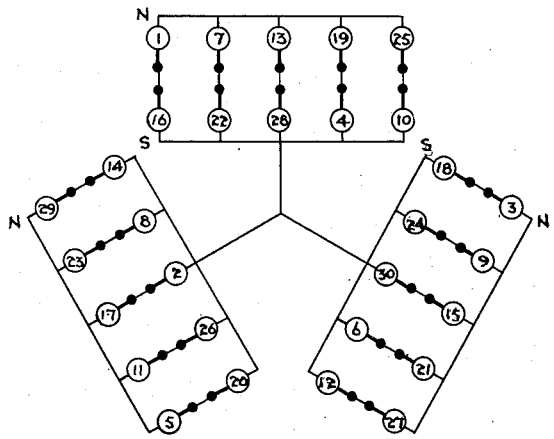
Figure 13 is a diagram illustrating a winding suitable for use on one member of a machine, the other member of which carries a winding similar to Figure 12.

The winding shown in Figure 13 will do this.

This winding has a number of sections suitable for a 10 pole 3-phase winding, all the N poles say on each phase being connected in parallel and in series with the S poles diametrically opposite.

On 10 poles, the same voltage is induced in each of these 5 sections which are therefore in parallel, but on 2 poles a balanced set of polyphase voltages is induced in these 5 sections which are short circuited on themselves. Hence heavy currents will flow which will serve as the secondary currents to drive the motor.

I claim:

1. A machine for changing the frequency of alternating currents comprising a rotor member and a stator member, a winding arrangement mounted on one of said members to produce two sets of fluxes of two pole numbers differing by four or more and superimposed in the same magnetic circuit, and a common winding on the other of said members arranged to have both motor and generator currents generated therein by the said fluxes.

2. A machine for changing the frequency of alternating currents comprising a single rotor and stator unit in which the stator is provided with a field winding connected to produce a flux having an odd number of pairs of magnetic poles, and a separate field winding connected to produce a flux having an even number of pairs of magnetic poles differing by four or more and superimposed in the same magnetic circuit as said first-mentioned flux, and said rotor being provided with windings having diametrically opposite sections joined in parallel.

3. A machine for changing the frequency of alternating currents comprising a rotor member and a stator member, a winding arrangement mounted on one of said members to produce two sets of revolving fluxes of two pole numbers differing by four or more and superimposed in the same magnetic circuit and a common winding on the other of said members arranged to have both motor and generator currents generated therein by the said fluxes.

4. A machine for changing the frequency of alternating currents comprising a rotor member and a stator member, a winding arrangement mounted on one of said members to produce two sets of fluxes the one revolving and the other fixed and of two pole numbers differing by four or more, said fluxes being superimposed in the same magnetic circuit, and a common winding on the other of said members arranged to have both motor and generator currents generated therein by the said fluxes.

5. A machine for changing the frequency of alternating currents comprising a single rotor and stator unit forming a common flux path for two sets of superimposed fluxes of even and odd numbers of pairs of poles differing by two or more, windings to produce said fluxes on one member, and windings on the other member with diametrically opposite sections joined in parallel.

6. A machine for changing the frequency of alternating currents comprising a single rotor and stator unit having a winding arrangement on one of the members to produce two sets of fluxes of pole numbers differing by four or more and superimposed in the same magnetic circuit, the windings on one member having all the sections on each phase in which the EMF's generated by the flux of one pole number are equal connected in parallel.

7. A machine for changing the frequency of alternating currents comprising a single rotor and stator unit forming a common magnetic circuit for two sets of fluxes of pole-numbers differing by four or more, a single winding on one of the members to produce said fluxes, and a single winding on the other member arranged to have both motor and generator currents generated therein by the said fluxes.

8. A machine for changing the frequency of alternating currents comprising a single rotor and stator unit carrying two sets of fluxes of pole-numbers differing by four or more and superimposed in the same magnetic circuit, a single winding on one member being adapted to produce a flux of one of said pole-numbers and short circuited on the flux of the other pole-number, a single winding on the other member adapted to produce a flux of said other pole-number and short circuited on the flux of the first-mentioned pole-number, and means to supply the magnetizing volt amperes to excite the flux of said other pole-number.

9. A machine for changing the frequency of alternating currents comprising in combination with a polyphase supply, a single rotor and stator unit carrying two sets of fluxes of pole-numbers differing by four or more and superimposed in the same magnetic circuit, a single winding on one member adapted to generate fluxes of both pole-numbers, and windings on the other member adapted to have voltages developed therein by said fluxes, said last-mentioned windings forming a short circuit for the voltages developed therein by one of said fluxes to produce a torque to drive said rotor and forming a network to deliver the voltages developed therein by the other of said fluxes.

10. A machine for changing the frequency of alternating currents comprising a single rotor and stator unit carrying two sets of fluxes of pole-numbers differing by four or more and superimposed in the same magnetic circuit, a single winding on one member adapted to generate fluxes of both pole-numbers, means of supply having a suitable number of phases, and a single winding on the other member short circuited for the voltage developed therein by one of said fluxes and adapted to generate voltage corresponding to the other of said fluxes.

11. A machine for changing the frequency of alternating currents comprising a single rotor and stator unit carrying 2 pole and 10 pole fluxes in the same magnetic circuit, a single winding on one member adapted to produce both 2 and 10 pole fluxes and capable of connection to a 3-phase circuit, and windings on the other member adapted to form a short circuit for voltages developed therein by said 2 pole flux to produce a motor action to drive said rotor, and adapted to generate voltages corresponding to said 10 pole flux.

12. A machine for changing the frequency of alternating currents comprising a single rotor and stator unit carrying 2 and 10 pole fluxes in the same magnetic circuit, a single winding on one member adapted to produce both 2 and 10 poles and capable of connection to a 3-phase circuit, and a single winding on the other member adapted to form a short circuit for voltages developed therein by said 2 pole flux to produce a motor action to drive said rotor, and adapted to generate voltages corresponding to said 10 pole flux.

13. A machine for changing the frequency of alternating currents comprising a stator having a 2 pole field winding comprising diametrically opposite sections joined in parallel and a 12 pole field winding having opposite sections joined in parallel, and a rotor having 12 pole windings with opposite sections joined in parallel.

14. A machine for changing the frequency of alternating currents comprising a stator having a 3-phase odd-numbered pole winding of six coil sections and a 3-phase even-numbered pole winding of 36 coil sections, and a rotor having an even-numbered pole 3-phase winding connected in two parallels to short circuit said odd-numbered pole field.

FREDERICK CREEDY.

REFERENCES CITED

The following references are of record in the file of this patent:

UNITED STATES PATENTS

| Number | Name | Date |
|--------|------|------|
| 859,359 | Alexanderson | July 9, 1907 |

FOREIGN PATENTS

| Number | Country | Date |
|--------|---------|------|
| 285,852 | Italy | May 25, 1931 |